(12) United States Patent
Synnestvedt et al.

(10) Patent No.: US 7,400,580 B1
(45) Date of Patent: Jul. 15, 2008

(54) METHOD AND APPARATUS FOR NORMALIZING SERVICE LEVEL AGREEMENTS IN A NETWORK

(75) Inventors: Robert Synnestvedt, Palo Alto, CA (US); Harsha Venkataramu, Union City, CA (US); Anurag Dhingra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 996 days.

(21) Appl. No.: 10/334,969

(22) Filed: Dec. 30, 2002

(51) Int. Cl.
*G06F 11/00* (2006.01)

(52) U.S. Cl. .................. 370/230; 370/235; 370/252; 709/224; 709/225

(58) Field of Classification Search ............ 370/230, 370/235, 241, 250, 252, 230.1; 709/223, 709/224, 225
See application file for complete search history.

(56) References Cited

U.S. PATENT DOCUMENTS

| | | | |
|---|---|---|---|
| 5,907,675 A * | 5/1999 | Aahlad ................... | 709/203 |
| 6,117,188 A * | 9/2000 | Aronberg et al. ........... | 717/176 |
| 6,738,819 B1 * | 5/2004 | Li et al. .................... | 709/229 |
| 6,857,019 B1 * | 2/2005 | Sitaraman et al. .......... | 709/225 |
| 6,970,924 B1 * | 11/2005 | Chu et al. .................. | 709/224 |
| 7,028,073 B1 * | 4/2006 | Bui et al. ................... | 709/203 |
| 2004/0114518 A1 * | 6/2004 | MacFaden et al. ........ | 370/230.1 |
| 2004/0203721 A1 * | 10/2004 | Grooms .................... | 455/423 |

* cited by examiner

*Primary Examiner*—Chi Pham
*Assistant Examiner*—Shick Hom
(74) *Attorney, Agent, or Firm*—Stolowitz Ford Cowger LLP (57) ABSTRACT

This disclosure provides a method and apparatus for normalizing service level agreements across entire networks. By utilizing a new parameter called the virtual call count, a wholesale network provider can monitor a variety of related network status indications and provide to their customers increased insight into the nature of the service level rejections that they experience. Existing service level agreement processors can be equipped with the additional functionality of calculating the virtual call count to form an apparatus for normalizing service level agreements.

14 Claims, 5 Drawing Sheets

| POLICY ID | ACTIVE POLICY PERCENTAGE | CURRENT LIMIT DEFICIT | ACTIVE CALL COUNT | VIRTUAL CALL COUNT | NORMAL POLICY LIMIT | OVER SUBSCRIPTION LIMIT | MAX LIMIT DEFICIT | REJECTION START TIME | REJECTION MAX TIME | TOTAL REJECT COUNT |
|---|---|---|---|---|---|---|---|---|---|---|
| CustA | 107% | 84 | 1200 | 1284 | 1000 | 200 | 91 | 18:21:03 | 18:24:38 | 679 |
| CustB | 104% | 4 | 99 | 104 | 100 | 0 | 5 | 18:55:03 | 18:55:03 | 9 |
| CustC | 117% | 2 | 12 | 14 | 12 | 0 | 2 | 18:46:03 | 18:46:03 | 5 |
| CustD | 101% | 8 | 1097 | 1108 | 1000 | 100 | 17 | 18:21:03 | 18:24:38 | 81 |

METHOD AND APPARATUS FOR NORMALIZING SERVICE LEVEL AGREEMENTS IN A NETWORK

FIELD OF THE INVENTION

This disclosure relates generally to network devices, and in particular to network devices that normalize service level agreements across any service, any port (ASAP) networks.

BACKGROUND OF THE INVENTION

In a typical Internet session, a user dials up a local access number for their Internet Service Provider (ISP). The local access number provides the user entry into the ISP's network, which may be owned by a wholesaler. The wholesaler allows the ISP to use the physical connections, routers, and servers under a lease agreement that is typically known as a service level agreement (SLA). The wholesaler must purchase enough equipment, ports and circuits, with enough redundancy to be able to honor the SLAs. The local access entry point into which the user dials may be referred to as a point-of-presence (POP), the network may be referred to as a wholesale network and the ISP may be the wholesaler's customer.

In some implementations, wholesalers manage their networks through a single resource server. As wholesalers expand policy enforcement applications, some have moved to several different servers and network devices that distribute the policy management tasks. An example of such a distributed system is Cisco's Resource Policy Management System (RPMS).

When end users are rejected after trying to initiate an ISP session, they will frequently register their complaints with their ISP. The ISP, in turn, may seek explanation from the wholesale network owner when their customer service is interrupted. The ISP and other customers of the wholesale network owner are accustomed to counting the total number of rejections that they experience during a period of time. However, wholesale providers do not typically compare the rejections their customers receive in light of the total rejections for every SLA on the network because the cumulative values can be enormous and also because the number of sessions serviced under large SLAs can dwarf those of a small SLA by several orders of magnitude.

Wholesale providers must be able to simultaneously monitor multiple customer accounts where each account may differ in active calls by the two to three orders of magnitude. Embodiments of the invention, as will be explained, address these and other problems.

BRIEF DESCRIPTION OF THE DRAWINGS

The invention will be understood in greater detail when read in conjunction with the following FIGURES, wherein.

DETAILED DESCRIPTION OF THE INVENTION

Figure 1:
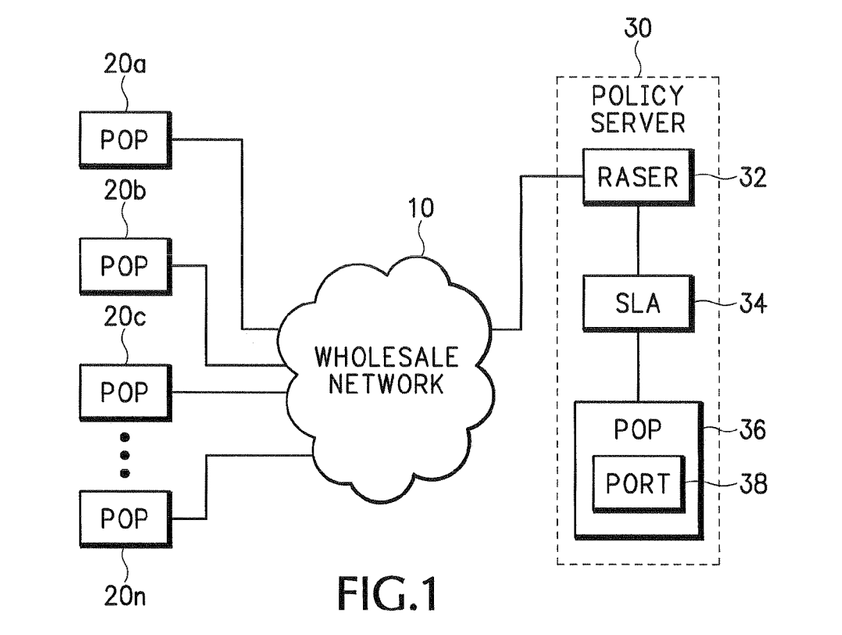
FIG. 1 is a schematic drawing of a wholesale network, multiple POP access points to the network, and a policy server.

FIG. 1 is a schematic drawing of a wholesale network 10, multiple POP access points 20a-20n providing access to the network 10, and a policy server 30. Note that the Internet is being used as an example in this discussion since it is the most familiar example of a network, but any type of network may be included in the following description. Users access the wholesale network 10 through the POP access points 20a-20n. The wholesale network 10 is governed by a policy server 30, which in one embodiment is a policy server such as Cisco's Resource Policy Management System. The policy server 30 may include several policy processors, such as a Remote Access Service router (RASER) 32, SLA server 34, and POP manager 36, which may include port manager 38.

The policy server 30 governs the network to ensure that agreements between the network wholesaler and its customers are met, as well as other policies, such as port policies and POP policies. Port policies may include a number of active ports allowed per customer or per piece of hardware; POP policies may govern the number of users associated with a particular customer allowed on a particular POP. Service level agreements are typically more complex because they govern the service level for a given number of users associated with a particular customer and can include such considerations as the time of day, a guaranteed service level, and a best efforts service level. All of these policies are coordinated by the policy server 30.

Although not shown in FIG. 1, the policy server 30 may be composed of multiple network devices such as two or more RASERs 32 and two or more SLA servers 34, where each RASER 32 receives call setup requests from the POP access points 20 in a distributed fashion. Depending on the customer requesting access, the RASER 32 then routs the call setup request to the appropriate SLA server 34. A single SLA server 34 may manage multiple customer SLAs. For example, one SLA server (SLA-A) may manage SLAs for a customer X and a customer Y, while another SLA server (SLA-B) manages the SLA for a customer Z. If the RASER 32 sequentially receives call setup requests from a customer X subscriber, a customer Z subscriber, and then a customer Y subscriber, the RASER 32 routs those calls to the SLA server SLA-A, SLA server SLA-B, then SLA server SLA-A, respectively.

The SLA servers 34 maintain the current state of that customer's current usage level, or the current customer's state. It is the comparison of the customer's state to the customer SLA that allows the SLA server 34 to determine if a current call setup request will violate the customer SLA. An important state of the customer SLA is the "active call count" parameter. For example, if the active call count for a particular customer is such that it has 7499 active calls on a POP for which it is only allowed an active session limit, or SLA limit, of 7500 calls, then just one more call setup request could be granted. If, however, the active call count was already at the SLA limit of 7500 active calls, any additional call setup request must be denied. Other parameters that may be governed by the SLA servers 34 may include the number of concurrent, active calls on the entire network, or the mix of voice and data traffic at a certain POP access point 20, or network-wide.

According to embodiments of the invention, additional functionality may be added to the SLA server 34. In addition to the usual parameters that the SLA server 34 handles, another parameter is introduced and will be subsequently referred to as the "virtual call count". There is a virtual call count for each and every customer SLA that is active on the network. The virtual call count for a customer SLA is an estimate for the number of active sessions that would exist for a particular customer if there were no SLA limit for that customer.

If the actual call count never reaches the active call limit, the virtual call count and the active call count are the same. When the active call count is at the active call limit, the virtual call count and the active call count may start to diverge if any call-setup requests are rejected. For example, if no call setup requests are rejected while the active call count is at the SLA limit, the virtual call count is equal to the active call count. On the other hand, if three call setup requests are received while the active call count is at the SLA limit, the virtual call count is incremented by one, above and beyond the active call count, for every rejected call setup request. Thus, the virtual call count and the active call count now differ by three.

Continuing with the example, if an active call subsequently disconnects, the active call count is decreased by one, just below the SLA limit. Additionally, the virtual call count is decreased by one as well, maintaining the difference of three between the actual call count and the virtual call count. At this point, there is now room for one more active call under the SLA. The next call setup request received increases the actual call count to the SLA limit, and the virtual call count is increased by one as well to maintain the difference of three. Additional rejected call setup requests when the active call count is at the SLA limit will further separate the virtual call count from the actual call count.

With the virtual call count parameter defined, many other useful parameters may be derived to enable the SLA server 34 to calculate additional metrics useful for monitoring customer SLA status on the network. For example, in accordance with an embodiment of the invention, a "limit deficit" parameter is the difference between the virtual call count and the active call limit for a particular SLA. The limit deficit is only meaningful when the virtual call count exceeds the active call limit.

In accordance with embodiments of the invention, an "active policy percentage" parameter is defined as the virtual call count divided by the SLA limit, expressed as a percentage. For example, an active policy percentage of 107% implies that an additional 7% of the call setup requests would have been accepted had there been no SLA limit. In other words, if the SLA limit was set 7% higher, then no call setup requests would be rejected. If, however, the active call count is at or below the SLA limit, the virtual call count is equal to the active call count (because no call setup requests are being rejected), and the active policy percentage will be less than or equal to 100%. For example, an active policy percentage of 72% indicates that the number of active calls is currently at 72% of the SLA limit.

As currently defined, the virtual call count is increased above the actual call count by one every time a call setup request is rejected. However, if this process were allowed to continue without some adjustment it would artificially inflate the virtual call count and in turn, the active policy percentage. That is why embodiments of the invention also decrement the virtual call count by use of a parameter called the "virtual call duration." The virtual call duration is the length of time that a rejected call setup request continues to be counted as part of the virtual call count. In other embodiments of the invention, the virtual call duration is the length of time that the current value for the virtual call count remains valid. For example, if the virtual call duration is twenty minutes, only the rejected call setup requests for the last twenty minutes are valid for calculating the virtual call count, and the rejected call requests for the previous twenty minutes (and the associated virtual call count for that length of time) expire.

According to embodiments of the invention, the actual value for the virtual call duration itself may be determined in a number of ways. It may be arbitrarily fixed by the wholesale provider. It may be statistically determined based on the duration of past active calls during particular timeframes. It may be determined individually for each active call rejection by a running average of past active call durations from the same subscriber. It may be periodically and automatically changed according to a quasi-random distribution about the statistically determined value. These examples are just a small subset of the variety of possible ways to determine the virtual call duration.

In other embodiments of the invention, a "virtual call history" parameter tracks the virtual call count as a function of time. The virtual call history allows the wholesale network provider to easily compare the virtual call count for different periods with the active call history (the active call count as a function of time) to ascertain whether SLA limits should be increased to accommodate increased numbers of call setup requests.

According to other embodiments of the invention, a "rejection rate" parameter is the total number of rejected call setup requests for a particular customer SLA during a selected sampling interval divided by the total number of call setup requests for that customer SLA received during the same sampling interval. Preferably, the sampling interval is a whole number of minutes (eg, every 3 minutes, every 5 minutes, etc), but other units or lengths of time could just as easily be used.

According to preferred embodiments of the invention, the SLA server 34 performs the operations necessary to calculate the parameters defined above and the results of these calculations are immediately provided to the wholesale provider as visual "instrumentation" or "snapshots" of customer SLA status which can be displayed on attached network devices. Alternatively, the SLA server 34 may also store the results of the calculations for later analysis. Embodiments of the invention have a distinct advantage over conventional network management tools in this respect because the embodiments calculate the parameters as things are happening. Conventional systems, if they perform network performance calculations at all, must do so by analyzing log files, or "Call Detail Records." The Call Detail Records have an enormous volume of data, so processing those log files after the fact is simply not practical.

The parameters calculated by embodiments of the invention allow the wholesale network provider to compare the relative status of customer activity immediately, so that the wholesale network providers may know which customers are experiencing rejections and which customers are approaching their SLA limit. In preferred embodiments, the calculated parameters are used as tools for automatically adjusting customer SLA limits, providing the customer with improved service.

Figure 2:
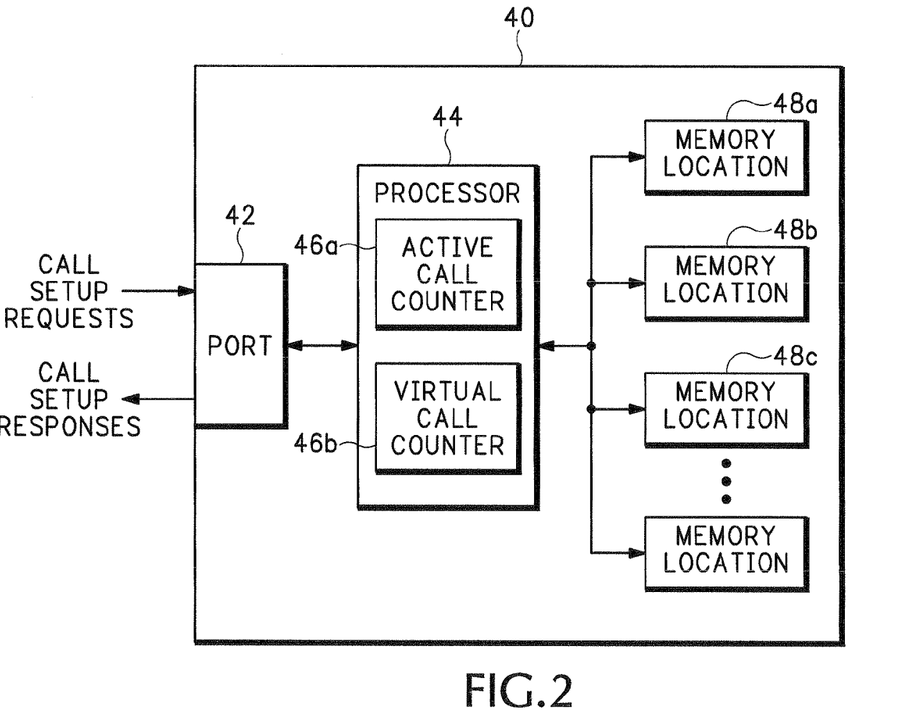
FIG. 2 is a block diagram of a network device in accordance with embodiments of the invention.

FIG. 2 illustrates the block diagram of a network device 40 in accordance with embodiments of the invention. Network device 40 may be configured to function as the SLA server 34 as shown in FIG. 1. The port 42 of network device 40 receives forwarded call setup requests from other network devices, such as the RASER 32 shown in the policy server 30 of FIG.

1. The processor 44 then receives the call setup request from the port 42. When a call setup request is received, processor 44 retrieves the number of current active calls from one of the memory locations 48a, 48b, 48c, etc. and compares that number to the SLA limit. If the number of current active calls is less than the SLA limit, an acceptance is sent to the requesting device through port 42. Simultaneously, the active call counter 46a is incremented by one, and the virtual call counter 46b is incremented by one as well. Both of the values indicated by active call counter 46a and virtual call counter 46b are stored in one of the memory locations 48a, 48b, 48c, etc. Conversely, if the number of current active calls is equal to the SLA limit, a rejection is sent to the requesting device through port 42. The active call counter 46a remains at the SLA limit but the virtual call counter is incremented by one and the new virtual call count stored in one of the memory locations 48a, 48b, 48c, etc. With these two values and a plurality of memory locations 48a, 48b, 48c, etc. for data storage, the network device 40 has the ability to calculate the parameters that were previously defined in accordance with embodiments of the invention. Once the parameters are calculated, they too may be stored in one of the plurality of memory locations 48a, 48b, 48c, etc. or sent to other network devices for storage or display.

Figure 3:
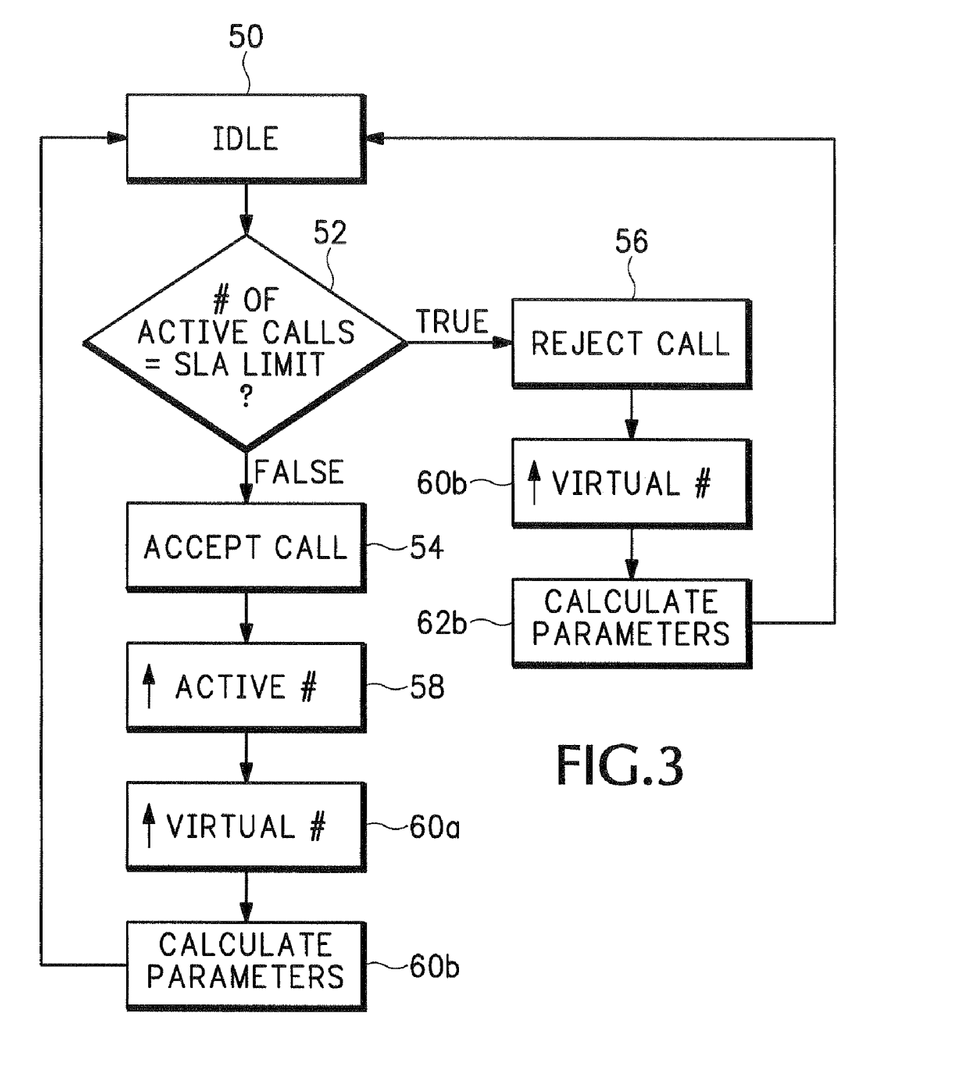
FIG. 3 is a flowchart illustrating a few of the basic processes followed by the network device of FIG. 2 when operating in accordance with embodiments of the invention.

FIG. 3 is a flowchart illustrating a few of the basic processes followed by the network device 40 of FIG. 2 when operating in accordance with embodiments of the invention. Idle process 50 is the starting point for the flowchart. This does not mean the processor 44 of network device 40 is doing nothing, merely that it is waiting for a call setup request to arrive. Once that happens, the number of current active calls for the SLA is compared to the SLA limit in comparison process 52. An acceptance is sent to the customer in acceptance process 54 if the number of active calls is not equal to the SLA limit and a rejection is sent to the customer in rejection process 56 if the number of active calls is equal to the SLA limit. If the result of comparison process 52 is a false value, the active call count for the SLA is incremented in process 58 and the virtual call count incremented in process 60a. If the result of comparison process 52 returns a true value, only the virtual call count is increased in process 60b. Regardless of the outcome of the comparison 52, eventually one or all of the parameters previously described will be calculated in calculation processes 62a, 62b. Later the processor 44 returns to the idle process 50 and await the arrival of the next call setup request.

It should be noted that the order in which processes are shown in FIG. 3 does not necessarily limit the processes to only that order. For example, in the "FALSE" branch of comparison process 52, the virtual call count might be incremented before or at the same time that the actual call count is incremented.

Some processes, although described elsewhere, are not shown in FIG. 3 for ease of explanation. For example, the processor 44 of network device 40 also stores the results of its calculations in memory locations 48a, 48b, 48c, etc., but this is not shown in the flowchart of FIG. 3. Additionally, the situation described previously where both the actual call count and virtual call count are decremented when an active call disconnects is not shown in FIG. 3. The fact that not all possible processes performed by the processor 44 are shown should not be construed to limit the invention in any way.

Figure 4:
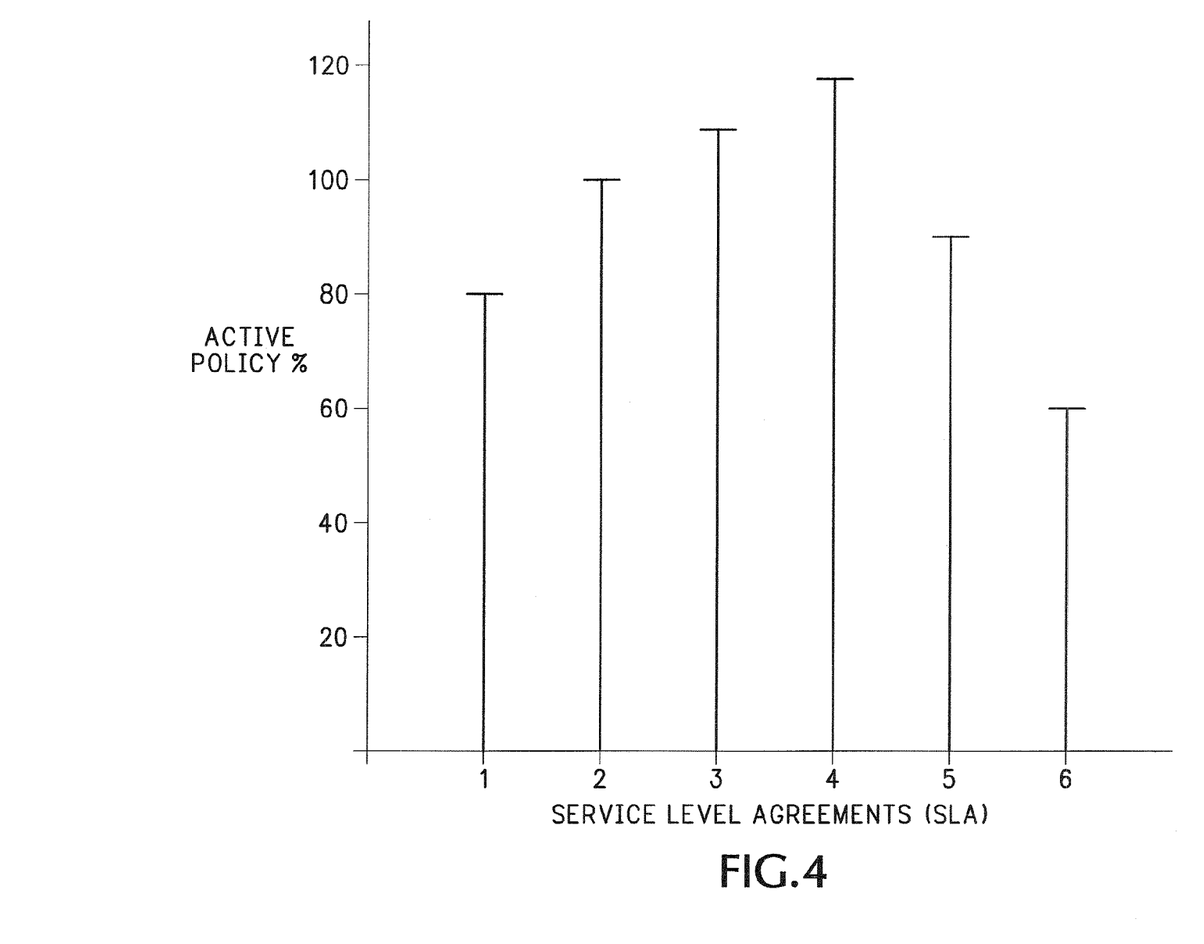
FIG. 4 is a histogram that displays SLA parameters generated according to one embodiment of the invention.
Figure 5:
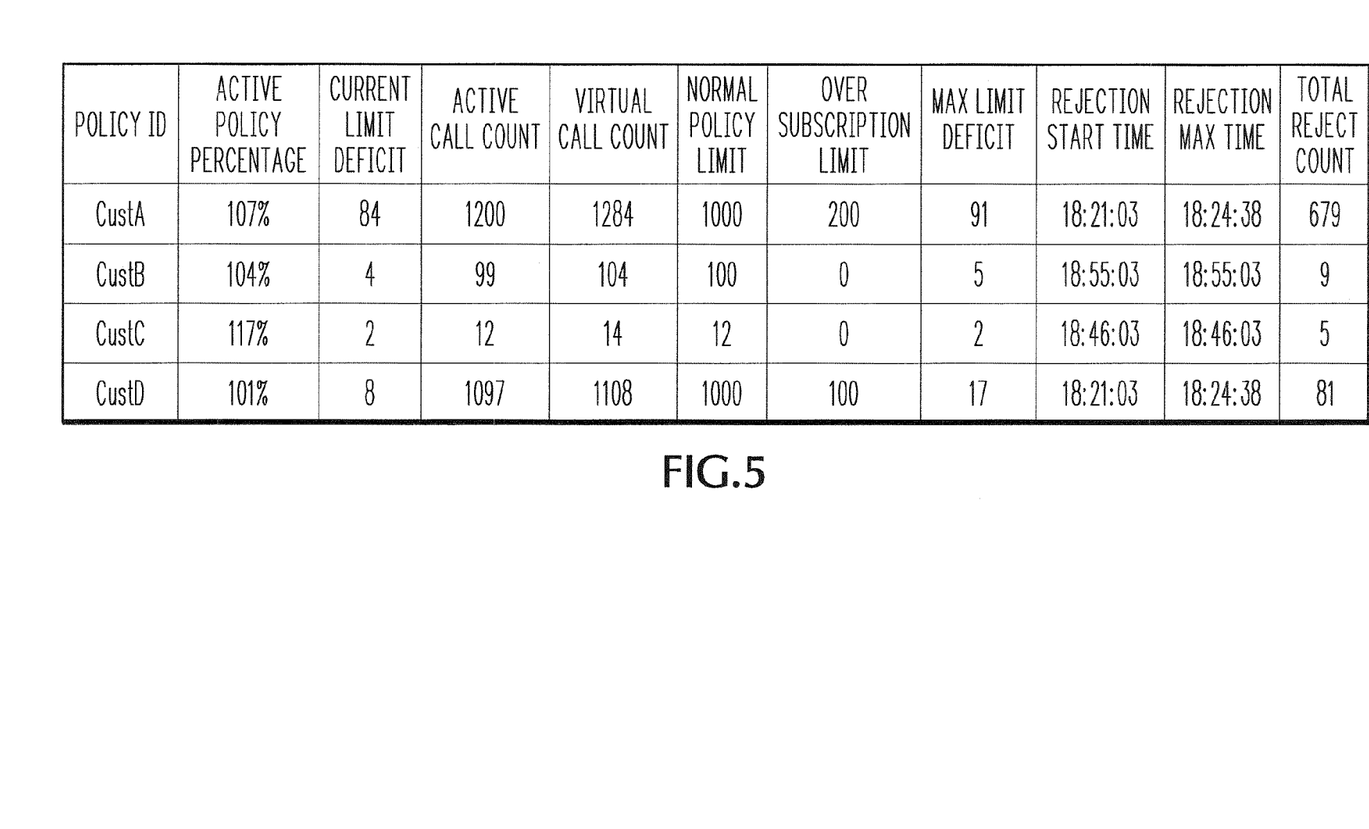
FIG. 5 is a sample spreadsheet entry that displays SLA parameters generated according to another embodiment of the invention.
Figure 6:
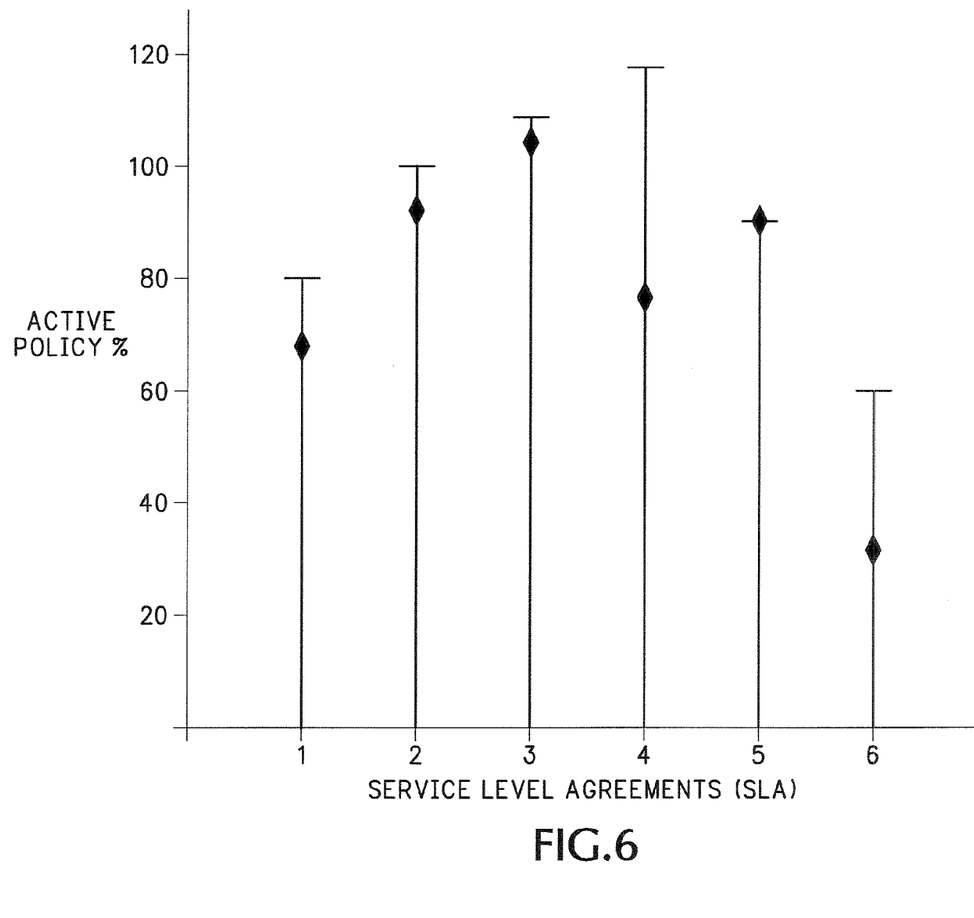
FIG. 6 is a second histogram that displays SLA parameters generated according to another embodiment of the invention.

FIGS. 4, 5, and 6 are examples of how the parameters generated in accordance with embodiments of the invention might be displayed for the wholesale network provider. In FIG. 4, for example, the current active policy percentage for six different service level agreements is portrayed in histogram form. Each of the six service level agreements corresponds to one customer, and the fact that only six SLAs are shown should not be taken as limiting in any respect. A quick glance at FIG. 4 reveals that SLA 1, SLA 2, and SLA 3 have active policy percentages of 100%, 108%, and 116%, respectively. None of these service level agreements will be able to accept another call setup request. In fact, it is apparent that SLA 2 and SLA 3 are rejecting an additional 8% and 16%, respectively, of the call setup requests.

FIG. 5 is yet another example of a method for displaying parameters calculated in accordance with embodiments of the invention, this time in simple spreadsheet format. The Policy ID column in FIG. 5 lists four different customers A, B, C, and D, each of which have their own separate service level agreements. The other columns display parameters relevant to the SLA. Some of the parameters have been discussed already, such as active policy percentage, current limit deficit, active call count, virtual call count, and total reject count. Other columns, such as maximum limit deficit, rejection start time, and rejection max time, are self-explanatory.

The oversubscription limit in FIG. 5 is the amount by which the normal policy limit may be increased during peak usage periods. The sum of the normal policy limit and the oversubscription limit is equal to the absolute SLA limit discussed previously. For example, Customer A's active call count is 1200, which is 200 above the normal policy limit of 1000. However, Customer A is allowed to be "oversubscribed" by an additional 200 active calls if necessary. Customer A is presently using the full amount of the oversubscription limit of 200, up to the absolute SLA limit of 1200, and is rejecting additional call setup requests, as indicated by the current limit deficit of 84 and the virtual call count of 1284.

The total reject count is the absolute number of rejections experienced by the customer over a specified timeframe.

FIG. 6 is an example of how more than one SLA parameter generated in accordance with embodiments of the invention might be displayed. This particular display is very similar to that of a LED graphic equalizer used by audio systems. FIG. 6 is the same as FIG. 4, but with an additional small diamond for each SLA located in the histogram. In FIG. 4, the top of the bar indicates the maximum active policy percentage that was achieved during a past selected period of time, while the diamond indicates the current active policy percentage. For example, SLA 4 reached a maximum active policy percentage of 116%, but is currently well under the SLA limit at 76%. Similarly, SLA 5 is currently at an active policy percentage of 88%, which also happens to be the maximum active policy percentage achieved.

FIGS. 4-6 illustrate only a few of the many possible ways to display parameters generated in accordance with embodiments of the invention, and they should not be taken as limiting in any way. These parameters may be displayed alongside or in conjunction with other, well-known parameters that are already in use. In particular, using displays such as those shown in FIG. 4 and FIG. 6, the wholesale network provider may quickly and efficiently monitor the SLA status for hundreds of customers across an entire network in real-time with the virtual call count parameter. Employees of the wholesale network provider can easily determine if there are certain SLAs that are experiencing a significantly higher or lower number of rejections as a percentage of the SLA limit, and then use these cues to look up more detailed information for the corresponding customer. By adding the improved functionality of calculating the virtual call count parameter to existing service level processors 30, an apparatus for normalizing service level agreements across an entire network is additionally achieved.

Furthermore, embodiments of this invention may be implemented as machine-readable code contained on a machine-readable medium. This medium may be used to upgrade existing network devices.

Although there has been described to this point a particular embodiment for a method and apparatus for normalizing service level agreements in a network, it is not intended that such specific references be considered as limitations upon the scope of this invention except in-so-far as set forth in the following claims.

The invention claimed is:

1. A network device that manages a service level agreement comprising:
    a first counter to store a number of current active sessions, up to an active session limit;
    a second counter to store a virtual call count, defined as the number of current active sessions that would exist if there were no active session limit; and
    a processor to calculate a plurality of parameters for the service level agreement using the active session limit and the virtual call count, and to accept and reject requests based upon the active session limit for the service level agreement.

2. The device of claim 1, wherein the processor is further to decrease the virtual call count by one whenever an elapsed time from when a request is rejected exceeds a predetermined duration.

3. A network that manages a service level agreement comprising:
    a first counter to store a number of current active sessions, up to an active session limit;
    a second counter to store a virtual call count, defined as the number of current active sessions that would exist if there were no active session limit;
    a processor to calculate a plurality of parameters for the service level agreement using the active session limit and the number of rejected requests, and to accept and reject requests based upon the active session limit for the service level agreement; and
    wherein the processor is further to
    decrease the virtual call count by one whenever an elapsed time from when a request is rejected exceeds a predetermined duration,
    divide the virtual call count by the active session limit, and
    subtract the active session limit from the virtual call count.

4. The device of claim 3, wherein the processor is further to divide a number of rejected requests during a selected period of time by a total number of requests during the second selected period of time.

5. The device of claim 3, wherein the processor is further to output the plurality of parameters to a display device.

6. An apparatus comprising:
    means for storing a number of current active sessions, up to an active session limit,
    means for storing a virtual call count, defined as the number of current active sessions that would exist if there were no active session limit; and
    means for calculating a plurality of parameters for a service level agreement using the active session limit and the virtual call count, and for accepting and rejecting requests based upon the active session limit for the service level agreement;
    wherein the means for calculating the plurality of parameters decreases the virtual call count by one whenever an elapsed time from when a request is rejected exceeds a predetermined duration, divides the virtual call count by the active session limit, and subtracts the active session limit from the virtual call count.

7. The apparatus of claim 6, wherein the means for calculating the plurality of parameters further divides a number of rejected requests during a selected period of time by a total number of requests during the selected period of time.

8. The apparatus of claim 6, wherein the means for calculating the plurality of parameters outputs the plurality of parameters to a display device.

9. A method comprising:
    storing a number of current active sessions, tip to an active session limit;
    storing a virtual call count, defined as the number of current active sessions that would exist if there were no active session limit;
    calculating a plurality of parameters for a service level agreement using the active session limit and the virtual call count, and
    accepting and rejecting requests based upon the active session limit for the service level agreement;
    wherein storing a virtual call count further comprises:
    decreasing the virtual call count by one whenever an elapsed time from when a request is rejected exceeds a predetermined duration; and
    wherein calculating the plurality of parameters further comprises:
        dividing the virtual call count by the active session limit, and
        subtracting the active session limit from the virtual call count.

10. The method of claim 9, wherein calculating the plurality of parameters further comprises:
    dividing a number of rejected requests during a selected period of time by a total number of requests during the selected period of time.

11. The method of claim 9, calculating the plurality of parameters further comprises outputting the plurality of parameters to a display device.

12. A machine-readable medium comprising machine-readable code which, when read, causes a network device to:
    store a number of current active sessions, up to an active session limit;
    store a virtual call count, defined as the number of current active sessions that would exist if there were no active session limit;
    calculate a plurality of parameters for a service level agreement using the active session limit and the virtual call count;
    accept and reject requests based upon the active session limit set forth in the service level agreement;
    decrease the virtual call count by one whenever an elapsed time from when a request is rejected exceeds a predetermined call duration;
    divide the virtual call count by the active session limit; and
    subtract the active session limit from the virtual call count.

13. A machine-readable medium comprising machine-readable code which, when read, causes a network device to:
    store a number of current active sessions, up to an active session limit;
    store a virtual call count, defined as the number of current active sessions that would exist if there were no active session limit;

calculate a plurality of parameters for a service level agreement using the active session limit and the virtual call count;

accept and reject requests based upon the active session limit set forth in the service level agreement;

decrease the virtual call count by one whenever an elapsed time from when a request is rejected exceeds a predetermined call duration; and divide a number of rejected requests during a selected period of time by a total number of requests during the selected period of time.

14. The device of claim 1, wherein the processor is further to divide a number of rejected requests during a selected period of time by a total number of requests during the selected period of time.

\* \* \* \* \*

UNITED STATES PATENT AND TRADEMARK OFFICE
CERTIFICATE OF CORRECTION

| | | |
|---|---|---|
| PATENT NO. | : 7,400,580 B1 | Page 1 of 1 |
| APPLICATION NO. | : 10/334969 | |
| DATED | : July 15, 2008 | |
| INVENTOR(S) | : Synnestvedt | |

It is certified that error appears in the above-identified patent and that said Letters Patent is hereby corrected as shown below:

At column 7, line 59, claim 6, please replace "limit," with --limit;--.

At column 8, line 15, claim 9, please replace "tip" with --up--.

Signed and Sealed this
Nineteenth Day of July, 2011

David J. Kappos
*Director of the United States Patent and Trademark Office*